United States Patent
Kowalewski (10) Patent No.: US 8,243,694 B2
(45) Date of Patent: Aug. 14, 2012

(54) DATA TRANSMISSION IN A TELECOMMUNICATION CONFERENCE

(75) Inventor: Frank Kowalewski, Unterhaching (DE)

(73) Assignee: Intel Mobile Communications GmbH, Neubiberg (DE)

( * ) Notice: Subject to any disclaimer, the term of this patent is extended or adjusted under 35 U.S.C. 154(b) by 1433 days.

(21) Appl. No.: 11/775,888

(22) Filed: Jul. 11, 2007

(65) Prior Publication Data

US 2008/0013466 A1    Jan. 17, 2008

Related U.S. Application Data

(60) Provisional application No. 60/807,043, filed on Jul. 11, 2006.

(30) Foreign Application Priority Data

Jul. 11, 2006  (DE) .......................... 10 2006 032 088

(51) Int. Cl.
*H04L 12/66* (2006.01)
*H04B 1/38* (2006.01)

(52) U.S. Cl. .......................... 370/335; 455/558; 709/219

(58) Field of Classification Search ............. 379/202.01, 379/203.01, 204.01, 204.02, 205.01, 206.01, 379/207.01; 455/416, 556.2, 418, 516, 517, 455/518; 370/352, 353, 354, 355, 356, 357, 370/358

See application file for complete search history.

(56) References Cited

U.S. PATENT DOCUMENTS

| | | | | | |
|---|---|---|---|---|---|
| 5,675,583 | A | * | 10/1997 | Bales et al. | 370/261 |
| 5,990,933 | A | * | 11/1999 | Ozone et al. | 348/14.09 |
| 6,826,173 | B1 | * | 11/2004 | Kung et al. | 370/352 |
| 7,197,535 | B2 | * | 3/2007 | Salesky et al. | 709/204 |
| 7,684,814 | B2 | | 3/2010 | Kim | |

(Continued)

FOREIGN PATENT DOCUMENTS

CN    1798375 A    7/2006

(Continued)

OTHER PUBLICATIONS

XCON Working Group, IETF Internet-Draft; The Binary Floor Control Protocol (BFCP).

(Continued)

*Primary Examiner* — Ahmad Matar
*Assistant Examiner* — Kharye Pope
(74) *Attorney, Agent, or Firm* — Dickstein Shapiro LLP (57) ABSTRACT

A communication terminal into which communication data can be input and which can receive a message signalling that at least one further communication terminal is ready to receive the communication data. Following receipt of the message, a transmission device configured to operate in a first mode, in which it sends data at a first data rate, and in a second mode, in which it sends data at a second data rate, which is higher than the first data rate, is used to send the communication data in the second mode.

14 Claims, 3 Drawing Sheets

U.S. PATENT DOCUMENTS

| | | | |
|---|---|---|---|
| 7,843,876 B2 * | 11/2010 | Holt et al. | 370/329 |
| 2003/0053423 A1 | 3/2003 | Mateu | |
| 2004/0037406 A1 * | 2/2004 | Gourraud | 379/202.01 |
| 2004/0057405 A1 * | 3/2004 | Black | 370/335 |
| 2005/0088981 A1 * | 4/2005 | Woodruff et al. | 370/260 |
| 2005/0164738 A1 * | 7/2005 | Liu | 455/558 |
| 2005/0232406 A1 * | 10/2005 | Kauppinen | 379/202.01 |
| 2005/0286473 A1 * | 12/2005 | Stubbs | 370/331 |
| 2006/0029092 A1 | 2/2006 | Luo et al. | |
| 2006/0045253 A1 * | 3/2006 | Bieselin et al. | 379/202.01 |
| 2006/0121925 A1 * | 6/2006 | Jung | 455/518 |
| 2006/0172755 A1 * | 8/2006 | Park | 455/518 |
| 2007/0041357 A1 | 2/2007 | Hoffmann et al. | |
| 2007/0127522 A1 * | 6/2007 | Lundh et al. | 370/468 |
| 2007/0162569 A1 * | 7/2007 | Robinson et al. | 709/219 |
| 2007/0263824 A1 * | 11/2007 | Bangalore et al. | 379/202.01 |
| 2009/0325561 A1 * | 12/2009 | Xu et al. | 455/416 |
| 2010/0035593 A1 * | 2/2010 | Franco et al. | 455/416 |

FOREIGN PATENT DOCUMENTS

| | | |
|---|---|---|
| DE | 101 17 679 A1 | 10/2002 |
| DE | 101 04 253 A1 | 12/2002 |
| DE | 103 42 294 A1 | 4/2005 |
| EP | 1 624 632 | 2/2006 |
| WO | WO-2004/028113 A1 | 4/2004 |
| WO | WO 2007140098 A3 * | 10/2008 |

OTHER PUBLICATIONS

OMA Open Mobile Alliance; "PoC User Plane", Candidate Version 1.0—Jan. 27, 2006.

Network Working Group, IETF Request for Comments RFC3550; "RTP: A Transport Protocol for Real-Time Applications".

SIPPING; Internet Draft; "A Session Initiation Protocol (SIP) Event Package for Conference State", draft-ietf-sipping-conference-package-12.

SIP; Internet-Draft; "A Framework for Conferencing with the Session Initiation Protocol", draft-ietf-sipping-conferencing-framework-01.

OMA Open Mobile Alliance; "Push to talk over Cellular (PoC)—Architecture", Candidate Version 1.0—Jan. 27, 2006.

* cited by examiner

FIG 1

FIG 3

DATA TRANSMISSION IN A TELECOMMUNICATION CONFERENCE

CROSS-REFERENCE TO RELATED APPLICATION

This application claims priority to Provisional Patent Application Ser. No. 60/807,043, which was filed Jul. 11, 2006, and German Patent Application No. 10 2006 032 088.3, filed Jul. 11, 2006, and is incorporated herein by reference in its entirety.

FIELD OF THE INVENTION

The invention relates to a communication terminal, a method for sending communication data, a conference server device and a method for forwarding communication data.

BACKGROUND TO THE INVENTION

It is desirable to avoid unnecessary data traffic in the course of telecommunication conferences. By way of example, it is desirable to reduce the data traffic in the course of a telecommunication conference provided by means of a mobile radio network on the air interface.

SUMMARY

In line with one exemplary embodiment of the invention, a communication terminal is provided which has an input device configured to input communication data needing to be sent in the course of a telecommunication conference into the communication terminal, and a memory configured to store the input communication data. The communication terminal also has a reception device configured to receive from a conference control server unit a message signalling that at least one further communication terminal is ready to receive the communication data, a transmission device configured to operate in a first mode, in which it sends data at a first data rate, and in a second mode, in which it sends data at a second data rate, the second data rate being higher than the first data rate, and a control device which, following receipt of the message, is configured to control the transmission device such that the transmission device sends the communication data in the second mode.

BRIEF DESCRIPTION OF THE FIGURES

Exemplary embodiments of the invention are illustrated in the figures and are explained in more detail below.

DETAILED DESCRIPTION

In the course of conference communication services, a plurality of participants in a conference are permitted to communicate with one another using communication terminals.

So that orderly communication in the course of a conference is possible, typically not all the participants in the conference simultaneously have the right to communicate, that is to say to send audio messages (or else video messages etc.) to the other conference participants. The communication right, that is to say the right to communicate, is allocated to the conference participants according to particular rules. This allocation is called "floor control". The rules are called the "floor policy".

In the case of communication systems in large conference rooms, that is to say in the case of permanently installed conference communication systems, the conference participants are provided with microphones and loudspeakers for voice communication. So that a conference participant can transmit an audio message to the other conference participants, the conference participant's microphone needs to have been activated in this case. Typically, when one microphone is activated, all the other microphones are disabled, that is to say that what is spoken into the other microphones is not output by means of the loudspeakers. In some cases, another microphone is also activated, for example that of the conference head.

In mobile radio communication systems, communication services are known which, like a conference communication system in a conference room or like communication by means of walkie talkies, allow only the transmission of audio messages from a single participant to the other conference participants at any time. These communication services are known by the name Push-To-Talk (PTT), such as the communication service "Direct Connect", which is provided by the company Nextel in the USA, and the communication service PoC (Push to Talk over Cellular), which is specified by the OMA (Open Mobile Alliance).

In similar fashion to the conference communication system described above which is used in a conference room, a conference participant using PTT needs to press a special key, typically on his mobile radio subscriber terminal, so that he is permitted to transmit audio messages. During the transmission of audio messages from this conference participant, the transmission of audio messages from other conference participants is disabled, that is to say that other conference participants are not permitted to transmit audio messages to conference participants.

In conference communication systems as proposed by the IETF (Internet Engineering Task Force), the allocation of the communication right is controlled by means of the BFCP (Binary Floor Control Protocol). In current PTT communication systems, that is to say in communication systems which are used to provide a Push-To-Talk communication service, the communication right is requested and allocated using the RTCP (Real Time Control Protocol). In this case too, the allocation of the communication right may alternatively be controlled by means of BFCP.

It is also customary for the participants in a conference to be able to be informed about the state of the conference by means of notification. By way of example, the participants can be notified of which participant is requesting the communication right for a particular medium (audio, video etc.). Notifications are implemented in conference communication systems, as proposed by the IETF, on the basis of the SIP (Session Initiation Protocol). In current PTT communication systems, RTCP is used to notify the participants about which of the participants is being allocated the communication right.

A user of a PTT communication system, that is to say of a communication system which is used to provide a PTT communication service, can be a participant of a plurality of PTT sessions at the same time.

If a user is a participant in a plurality of PTT sessions then he stipulates one of the PTT sessions as a primary session. The other instances of the PTT sessions are stipulated as secondary PTT sessions. If other participants send communication data (audio data, video data etc.) both in a secondary PTT session and in a primary PTT session in which the user is participating then only the communication data sent in the course of the primary PTT session are forwarded to the participant. Only if no communication data are sent by other participants in the course of the primary PTT session communication data which are sent in the course of a secondary PTT session are forwarded to the participant.

So that it may be ensured that the communication data sent by a participant can also be received by at least one further participant, typical PTT communication systems involve the communication right being allocated to the participant in the course of a PTT session only if at least one further participant is participating in the PTT session and has confirmed that he is receiving communication data sent in the course of the PTT session. This can result in delays in the allocation of communication rights when a PTT session is started.

When a participant joins a PTT session, he receives only communication data which have been sent in the course of the PTT session after he joined the PTT session in the course of the PTT session. Similarly, it may occur that a participant in a PTT session misses communication data sent in the course of the PTT session, that is to say does not receive them, since the PTT session is a secondary PTT session for the participant and communication data are sent in the course of a primary PTT session for the participant.

In line with one exemplary embodiment of the invention, a communication terminal is provided which has an input device, which can be used to input communication data needing to be sent in the course of a telecommunication conference into the communication terminal, and a memory which stores the input communication data. The communication terminal also has a reception device which receives from a conference control server unit a message signalling that at least one further communication terminal is ready to receive the communication data, a transmission device which can be operated in a first mode, in which it sends data at a first data rate, and in a second mode, in which it sends data at a second data rate, the second data rate being higher than the first data rate, and a control device which, following receipt of the message, controls the transmission device such that the transmission device sends the communication data in the second mode.

In line with further exemplary embodiments of the invention, a conference server device and a method for forwarding communication data in accordance with the communication terminal are provided.

In line with one exemplary embodiment of the invention, a method for sending communication data is provided in which communication data needing to be sent in the course of a telecommunication conference are input into a communication terminal, the input communication data are stored, a message is received which signals that at least one further communication terminal is ready to receive the communication data, following receipt of the message a transmission device, which can be operated in a first mode, in which it sends data at a first data rate, and in a second mode, in which it sends data at a second data rate, the second data rate being higher than the first data rate, is controlled such that it sends the communication data in the second mode.

The message is received from a conference control unit, for example.

The following exemplary embodiments of the invention, which are described in connection with the communication terminal, also apply mutatis mutandis to the method for sending communication data, to the conference server device and to the method for forwarding communication data.

Sending the communication data input into the communication terminal provided in the second mode, in which data are sent at a higher data rate, allows the communication data to be sent only when it is certain that a further communication terminal is ready to receive the communication data. A possible delay (for example of several seconds) between the start of input of the communication data and sending of the communication data can be compensated for, since the communication data are sent at an increased data rate and sending the communication data can therefore catch up with input of the communication data, for example.

By way of example, the first data rate is the data rate which is required and usually used in order to transmit the communication data to the further communication terminal in real time at a prescribed quality. If the communication data are audio data, for example, then the first data rate is the data rate which is required to transmit the audio data to the further communication terminal at a prescribed quality, so that the audio data are available in the further communication terminal at the prescribed quality and can be output only delayed in time by delays which arise as a result of transmitting the audio data and encoding and decoding the audio data at the same speed at which they were spoken into the communication terminal.

By way of example, real-time data transmission of communication data is to be understood to mean that the receiver of the communication data perceives the output of the received communication data as though they had been transmitted by the transmitter and originator of the communication data, for example the speaker of audio data, without any delay.

The second data rate is a data rate which is higher than the first data rate, for example a data rate increased by 25%, 50%, 75% or 100% or more. Accordingly, in the case of audio data, the audio data can be transmitted to the further communication terminal quickly enough for them to be available there at the prescribed quality and for them to be able to be output at a higher speed. This therefore means that the person listening to the audio data is also able to catch up with the speaking of the audio data when the audio data have begun to be spoken before the audio data have begun to be sent, for example several seconds beforehand, for example 3 seconds, 7 seconds or 10 seconds.

An advantage of one exemplary embodiment of the invention is that the sending of audio data does not need to be started until it is actually certain that a further communication terminal is ready to receive the communication data. By way of example, the communication data can be rejected if there is a relatively long period of time during which no further communication terminal is ready to receive the input communication data. By way of example, the communication terminal may contain a timer which measures the length of time between the start of input of the communication data and receipt of the message. If the length of time exceeds a prescribed threshold value, the process can be terminated and the communication data can be erased. It is also possible, by way of example, to ask the user whether it is necessary to continue waiting until the message is received or whether the process should be terminated.

This has the advantage that the communication data are sent only if they can actually be received by a party to the communication. This makes it possible to avoid unnecessary data traffic. If the communication terminal is a mobile radio subscriber appliance then the unnecessary transmission of communication data can be avoided on the air interface between the communication terminal and the relevant base station in the mobile radio communication system.

The effect achieved by this is that a user can start to input communication data immediately and, by way of example, does not need to wait for confirmation that he is being granted the communication right or a further user is participating in the telecommunication conference without communication data being sent unnecessarily and, by way of example, an air interface being burdened unnecessarily.

The control device in the communication terminal described above can control the transmission device such that it sends a further message specifying that the telecommunication conference needs to be set up.

In one embodiment, the control device controls the transmission device such that it does not send any communication data needing to be sent in the course of the telecommunication conference between the time at which the further message is sent and the time at which the message is received.

Thus, first communication data are not sent until the communication terminal has been notified that a further communication terminal is ready to receive the communication data. However, even before the communication data are sent, it is possible to start inputting the communication data into the communication terminal using the input device.

By way of example, the input device can be used to input the communication data as soon as the further message has been sent.

In line with one exemplary embodiment of the invention, input communication data are not sent immediately but rather are buffer-stored first. Buffer-storage is to be understood to mean buffer-storage which takes place before the buffer-storage carried out in the course of channel encoding or during buffering in the course of data transmission, for example.

By way of example, the message specifies that at least the further communication terminal is participating in the telecommunication conference.

The communication data are audio data, video data, image data or text data, for example. The telecommunication conference is a Push-To-Talk conference, for example.

By way of example, the communication terminal is a mobile radio subscriber appliance. Accordingly, the communication between the communication terminal and the conference control unit and the sending of the communication data are effected via the air interface of a mobile radio communication network, for example. In other words, the telecommunication conference is carried out using a mobile radio communication network. Alternatively, the telecommunication conference can be provided by means of a landline network. The telecommunication conference can also be provided by means of the Internet, for example, and the communication terminal may accordingly be an appliance with Internet Protocol capability which is coupled to the Internet.

By way of example, the mobile radio communication network is a mobile radio network based on the UMTS (Universal Mobile Telecommunications System) standard, based on the GSM (General System for Mobile Communications) standard or based on the CDMA 2000 standard (CDMA: Code Division Multiple Access).

Figure 1:
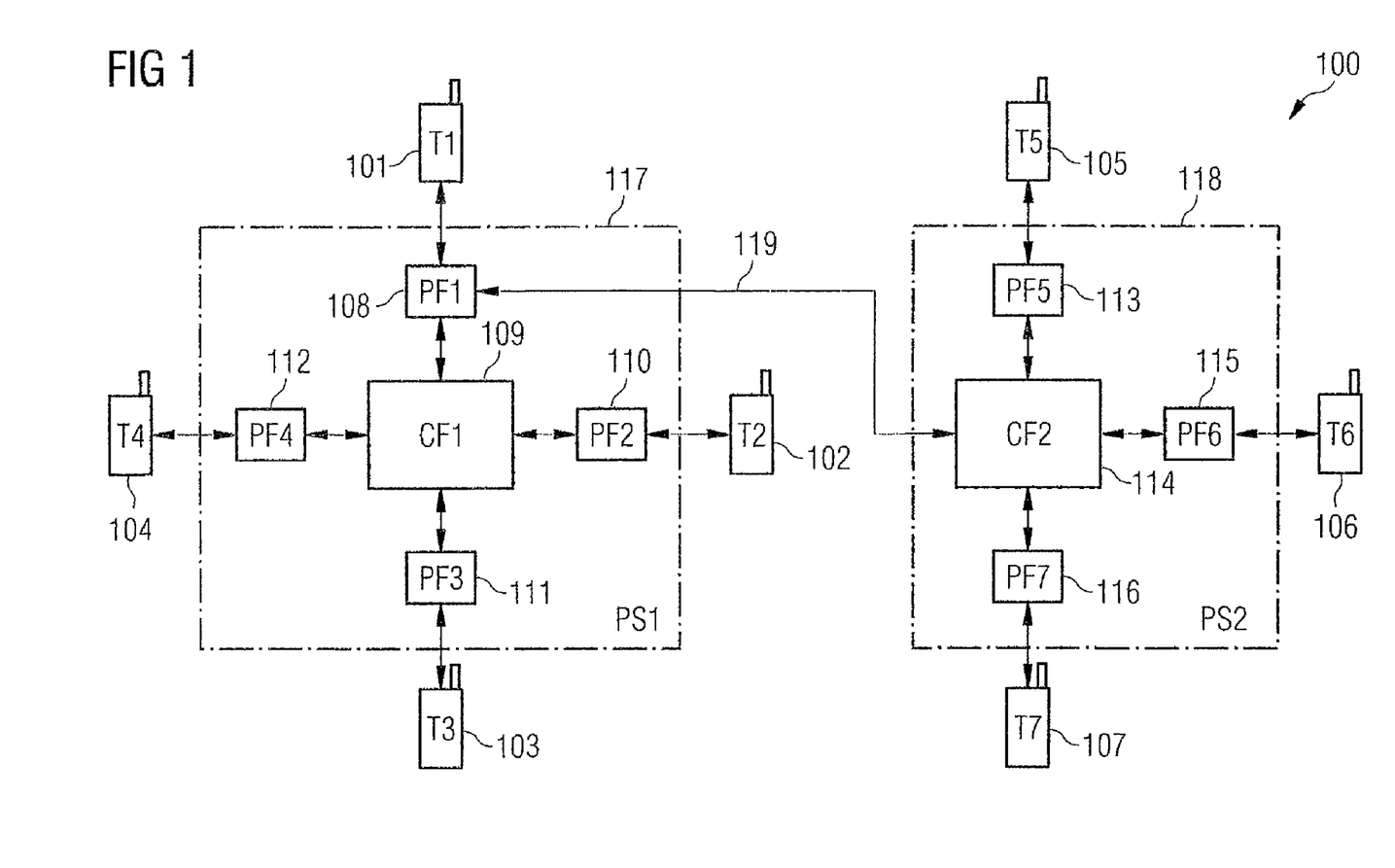
FIG. 1 shows a communication system based on an exemplary embodiment of the invention.

FIG. 1 shows a communication system 100 based on an exemplary embodiment of the invention.

The communication system 100 can be used to provide PTT conferences for a plurality of users. A first user uses a first communication terminal 101, a second user uses a second communication terminal 102, a third user uses a third communication terminal 103, a fourth user uses a fourth communication terminal 104, a fifth user uses a fifth communication terminal 105, a sixth user uses a sixth communication terminal 106 and a seventh user uses a seventh communication terminal 107.

The first communication terminal 101 is coupled to a first control server unit 109 (controlling function) by means of a first participant server unit (participating function) 108, the second communication terminal 102 is coupled to the first control server unit 109 by means of a second participant server unit 110, the third communication terminal 103 is coupled to the first control server unit 109 by means of a third participant server unit 111, the fourth communication terminal 104 is coupled to the first control server unit 109 by means of a fourth participant server unit 112, the fifth communication terminal 105 is coupled to a second control server unit 114 by means of a fifth participant server unit 113, the sixth communication terminal 106 is coupled to the second control server unit 114 by means of a sixth participant server unit 115, and the seventh communication terminal 107 is coupled to the second control server unit 114 by means of a seventh participant server unit 116.

The first participant server unit 108, the second participant server unit 110, the third participant server unit 111 and the fourth participant server unit 112 and also the first control server unit 109 are implemented by means of a first PTT (Push-To-Talk) server computer 117. The fifth participant server unit 113, the sixth participant server unit 115, the seventh participant server unit 116 and the second control server unit 114 are implemented by means of a second PTT server computer 118.

A control server unit has functionalities which are associated with the PTT session, that is to say the conference. A participant server unit has functionalities which are associated with the participant who is associated with the participant server unit. A participant server unit which is associated with a participant can therefore be considered part of the communication terminal used by the participant in order to participate in the conference. In the case of a mobile communication system, however, the participant server unit is arranged in the non-mobile part of the communication system.

A control server unit and a participant server unit associated with the participant in the PTT session can be implemented by different PTT server computers. By way of example, this is the case when the PTT session has been generated by means of a communication network which is not the home network of the participant. In this case, the participant server unit is implemented by means of a PTT server computer belonging to his own network operator, that is to say the operator of the participant's home network. By contrast, the control server unit for the PTT session is implemented by means of a PTT server computer belonging to the alien network operator, that is to say the network operator of the communication network which has been used to generate the PTT session. In the course of the PTT session, the participant communicates using a communication link between the PTT server computer belonging to his own network operator and the PTT server computer belonging to the alien network operator.

First of all, it is assumed that the first control server unit 109 is not yet providing a PTT session, that is to say is not yet providing a Push-To-Talk conference. In addition, in a first exemplary embodiment it is assumed that the second control server unit 114 is also not yet providing a PTT session.

In the exemplary embodiment explained below, it is also assumed that the user of the second communication terminal 102 wishes to initiate a PTT session using the first control server unit 109. The participants in the PTT session initiated by the user of the second communication terminal 102 will be the user of the first communication terminal 101, the user of the third communication terminal 103 and the user of the fourth communication terminal 104.

Figure 2:
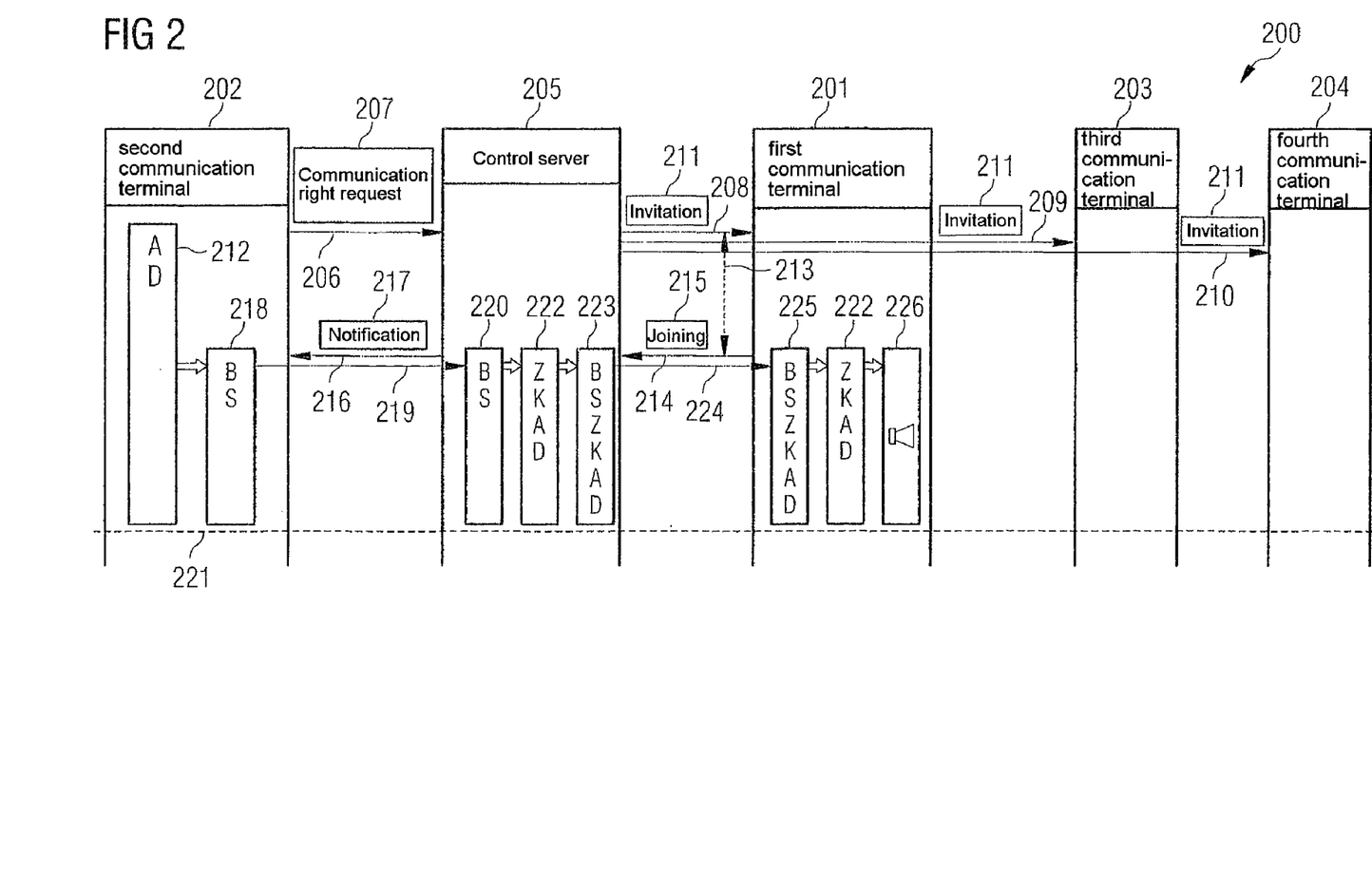
FIG. 2 shows a data flowchart based on an exemplary embodiment of the invention.

The corresponding flow of data and the sequence are shown in FIG. 2 and are explained below.

FIG. 2 shows a data flowchart 200 based on an exemplary embodiment of the invention.

The flow of data occurs between a first communication terminal 201, a second communication terminal 202, a third communication terminal 203, a fourth communication terminal 204 and a control server unit 205, which are designed and arranged as explained with reference to FIG. 1.

The user of the second communication terminal 202 wishes, as mentioned, to initiate a PTT session which is provided by means of the control server unit 205, which corresponds to the first control server unit 109 in FIG. 1, and in which the first communication terminal 201, the second communication terminal 202, the third communication terminal 203 and the fourth communication terminal 204 participate.

To this end, the second communication terminal 202 transmits a communication right request message 207 to the control server unit 205 in step 206. The communication right request message 207 is used by the second communication terminal 202 to request from the control server unit 205 that the control server unit 205 provide a PTT session which the first communication terminal 201, the third communication terminal 203 and the fourth communication terminal 204 are invited to join. In addition, the second communication terminal 202 uses the communication right request message 207 to request the communication right, that is to say the right to transmit communication data in the course of the PTT session which is to be set up by the control server unit 205.

In line with the communication right request message, the control server unit 205 transmits a respective invitation message 211 to the first communication terminal 201, the third communication terminal 203 and the fourth communication terminal 204 in steps 208, 209 and 210. The invitation messages 211 are used to ask the first communication terminal 201, the third communication terminal 203 and the fourth communication terminal 204 to join the PTT session which is provided by the control server unit 205 in line with the communication right request message 207.

At the same time as the communication right request message 207 is sent in step 206, the user of the second communication terminal 202 starts to speak audio data 212 into the second communication terminal 202. By way of example, the user of the second communication terminal 202 speaks into a microphone which is provided on or in the second communication terminal 202 while simultaneously pressing a special key, for example a PTT key, which is provided on the second communication terminal 202. The audio data 212 spoken by the user of the second communication terminal 202 are buffer-stored in the second communication terminal 202 using a memory in the second communication terminal 202.

In this exemplary embodiment, the user of the second communication terminal 202 speaks only audio data 212 into the second communication terminal 202, but in other embodiments he can also input text data or video data into the second communication terminal 202. By way of example, video data can be input using a digital camera with which the second communication terminal 202 is equipped.

When a certain period of time has elapsed, as indicated by the dashed double-headed arrow 213 in FIG. 2, the user of the first communication terminal 201 is ready to join the PTT session provided by the control server unit 205 in line with the communication right request message 207. Accordingly, the first communication terminal 201 transmits a joining message 215 to the control server unit 205 in step 214, said joining message being used to indicate that the first communication terminal 201 is joining the PTT session. The control server unit 205 then adds the first communication terminal 201 to the PTT session as a participant and in step 216 transmits a notification message 217 to the second communication terminal 202, said message being used to signal that the first communication terminal 201 has joined the PTT session.

The second communication terminal 202 therefore now knows that at least one participant is participating in the PTT session, namely the user of the first communication terminal 201. The second communication terminal 202 then converts the audio data 212 which have already been spoken and are currently being spoken by the user of the second communication terminal 202 into a bit stream 218, for example using suitable encoding of audio data, for example encoding based on an MPEG (Moving Pictures Expert Group) standard. The bit stream 218 is continuously transmitted to the control server unit 205 for as long as audio data 212 are being spoken into the second communication terminal 202 by the user of the second communication terminal 202 in step 219. The control server unit 205 receives the bit stream 218 as a received bit stream 220.

The bit stream 218 is transmitted from the second communication terminal 202 to the control server unit 205 at an increased bit stream data rate. That is to say that the bit stream data rate which is used to transmit the bit stream 218 is higher than the data rate required for real-time data transmission of the audio data 212.

This means that it is possible for the transmission of the bit stream 218 to catch up with the speaking of the audio data 212, for example. That is to say that, although the audio data 212 have already begun to be spoken when the communication right request message 207 was sent, but the bit stream 218 does not begin to be transmitted to the control server unit 205 until after receipt of the notification message 217, it is possible that all the audio data 212 which have already been spoken at the time at which speaking of the audio data 212 is ended, which is indicated by the dashed line 221, have already been converted into the bit stream 218 and have been transmitted to the control server unit 205. The transmission of the bit stream 218 therefore catches up with the speaking of the audio data 212 in the sense that after a particular time, the time of catching up, the audio data 212 which are currently being spoken are converted into the bit stream 218 and are transmitted to the control server unit 205.

So that the first communication terminal 201 is also provided with the option of catching up with the speaking of the audio data 212 in a similar manner, the received bit stream 220 is converted by the control server unit 205 into audio data 222 compressed in time. The time-compressed audio data 222 are compressed in time in comparison with the audio data 212, that is to say that the sound sequence in the audio data 212 is contained in the time-compressed audio data 222 at a higher speed. If the user of the second communication terminal 202 has spoken a sentence into the second communication terminal 202 within 10 seconds, for example, so that this sentence is now contained in the audio data 212 with a record length of 10 seconds, then this sentence is contained in the time-compressed audio data 222 with the record length of 7 seconds, for example, and would accordingly be output at an increased speaking speed in 7 seconds instead of in 10 seconds when the time-compressed audio data 222 are output.

Compression in time is not to be understood to mean source encoding or channel encoding, but rather condensing the audio data in time, in other words accelerating the sound sequence.

The time-compressed audio data 222 are converted by the control server unit 205 into a bit stream of time-compressed audio data 223 which is transmitted to the first communication terminal 201 in step 224 and is available there as a received bit stream of time-compressed audio data 225. The received bit stream of time-compressed audio data 225 is transformed back into the time-compressed audio data 222 by the first communication terminal 201, and these data are output by means of a loudspeaker 226 on the first communication terminal 201.

Since the time-compressed audio data 222 are compressed in time in comparison with the audio data 212, it is possible that the time-compressed audio data 222 in the first communication terminal 201 have also been output (after any delay as a result of the transmissions and conversions) to the user of the first communication terminal 201 in full at the time at which the speaking of the audio data 212 is ended, which is indicated by the dashed line 221, and that the output of the audio data 212 has caught up with the speaking of the audio data 212 in this sense.

In one embodiment, the bit stream of time-compressed audio data 223 is transmitted to the first communication terminal 201 at a normal data rate, that is to say the data rate required for real-time transmission of audio data.

If the third communication terminal 203 or the fourth communication terminal 204 joins the PTT session after the first communication terminal 201, the time-compressed audio data 222 can be transmitted in similar fashion to the third communication terminal 203 and to the fourth communication terminal 204. The time-compressed audio data 222 can be compressed still further in time in line with the later joining of the third communication terminal 203 and of the fourth communication terminal 204, so that the third communication terminal 203 and the fourth communication terminal 204 also have the opportunity to catch up with the speaking of the audio data 212.

Catching up is to be understood to mean that the time difference between the time at which a word (or a sound) is spoken into the second communication terminal and the time at which the word (or the sound) is output is reduced until it is so small that it now merely corresponds to the delay which arises as a result of the encoding, decoding and transmission of the spoken communication data.

At the time indicated by the dashed line 221, further audio data can immediately be spoken and transmitted, for example by the user of the first communication terminal 201, in the course of the PTT session because the first communication terminal 201 and possibly the third communication terminal 203 or the fourth communication terminal 204 have caught up with the speaking of the audio data 212.

In another embodiment, the first control server unit 109 provides a first PTT session for the first communication terminal 101 and the second communication terminal 102 (or for the relevant users). The second control server unit 114 provides a second PTT session for the first communication terminal 101, the fifth communication terminal 105, the sixth communication terminal 106 and the seventh communication terminal 107 (or for the relevant users).

In the course of the first PTT session and the second PTT session, the respective participants send and receive communication data (media data). In this exemplary embodiment, communication in the course of the PTT sessions is by means of audio data.

The first communication terminal 101 participates both in the first PTT session and in the second PTT session. In particular, a communication link 119 exists between the first participant server unit 108 and the second control server unit 114. It is assumed that the second PTT session is stipulated as the primary PTT session and the first PTT session is stipulated as a secondary PTT session. That is to say that the first participant server unit 108 forwards communication data needing to be transmitted to the first communication terminal 101 in the course of the first PTT session to the first communication terminal 101 only if no communication data currently need to be forwarded to the first communication terminal in the course of the second PTT session.

If the user of the second communication terminal 102 wishes to send data in the course of the first PTT session then these data are received by another user only if no communication data are currently being transmitted in the course of the second PTT session, since apart from the first communication terminal 101 and the second communication terminal 102 no other participant is participating in the first PTT session. In similar fashion to the exemplary embodiment described above with reference to FIG. 2, it is therefore not clear whether audio data (in general terms media data) spoken into the second communication terminal 202 are being received by a receiver. In the exemplary embodiment described with reference to FIG. 2, the reason for this is that it is not certain whether another participant besides the second communication terminal 202 will participate in the requested PTT session. In the exemplary embodiment which is now being described, the reason is that it is not certain whether communication data which are input into the second communication terminal 102 are being forwarded to the first communication terminal 101, since communication data may currently be transmitted to the first communication terminal 101 in the course of the second PTT session.

The procedure in this exemplary embodiment is similar to that in the exemplary embodiment described with reference to FIG. 2. Instead of the communication right request message 207, a communication right request message is transmitted to the first control server unit 109 and is used to request the communication right for the second communication terminal 102 in the course of the first PTT session. At the same time as the communication right request message is sent, the user of the second communication terminal 102 starts to input the communication data needing to be sent in the course of the first PTT session, for example to speak audio data, in similar fashion to FIG. 2. The first control server unit 109 checks whether communication data are being transmitted to the first communication terminal 101 in the course of the second PTT session, that is to say whether the first communication terminal 101 is ready to receive the communication data.

As soon as the first communication terminal 101 is ready to receive the communication data input into the second communication terminal 102, a notification message is transmitted, in similar fashion to the notification message 217, from the first control server unit 109 to the second communication terminal 202, signalling that the first communication terminal 201 is ready to receive the communication data which have been input. The rest of the procedure is similar to the exemplary embodiment described with reference to FIG. 2.

Figure 3:
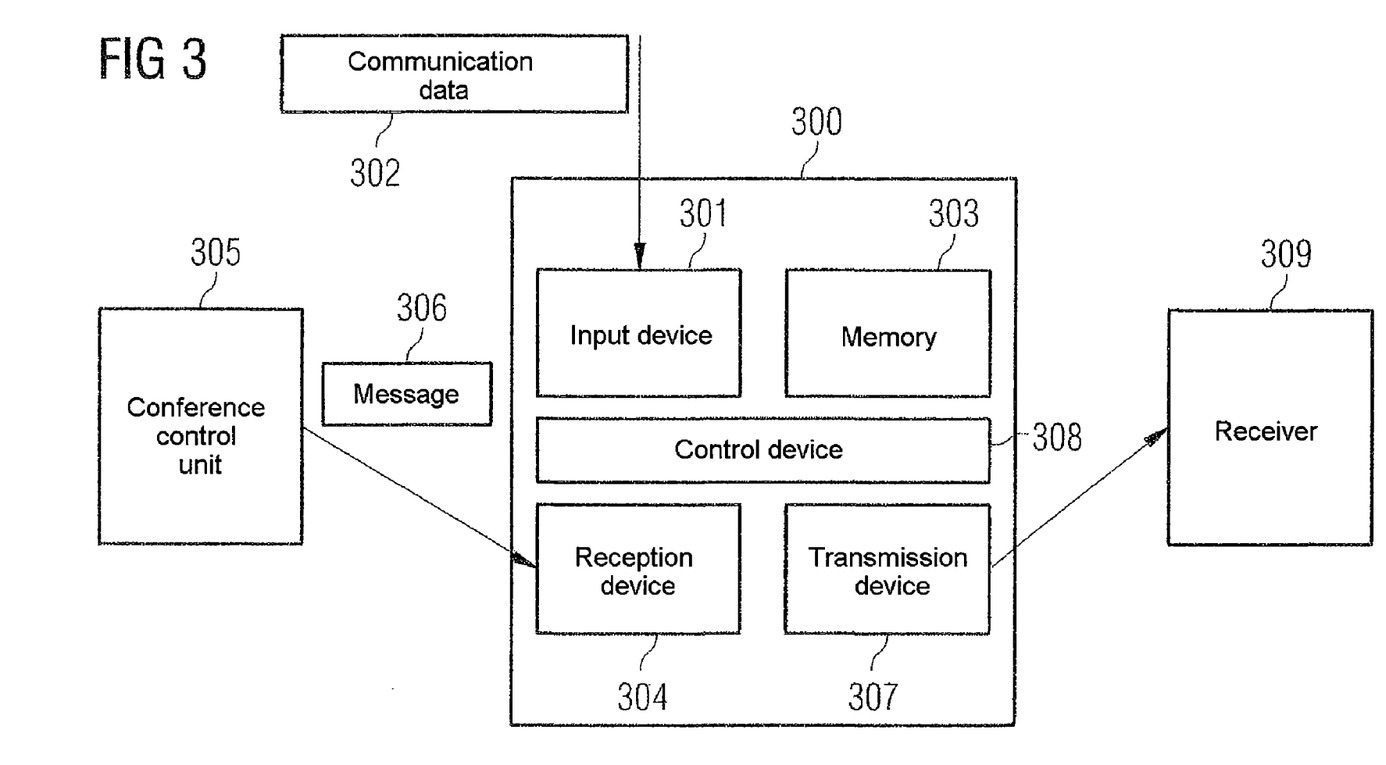
FIG. 3 shows a communication terminal based on an exemplary embodiment of the invention.

In summary, in line with one exemplary embodiment, a communication terminal is provided as shown in FIG. 3.

FIG. 3 shows a communication terminal 300 based on an exemplary embodiment of the invention.

The communication terminal has an input device 301 which can be used to input communication data 302 needing to be sent in the course of a telecommunication conference into the communication terminal 300. The communication terminal 300 also has a memory 303 which is set up to store the input communication data 302 and also a reception device 304 which is set up to receive from a conference control server unit 305 a message 306 signalling that at least one further communication terminal is ready to receive the communication data.

A transmission device 307 in the communication terminal 300 can be operated in a first mode, in which it sends data at a first data rate, and in a second mode, in which it sends data at a second data rate, the second data rate being higher than the first data rate. The communication terminal 300 also has a control device 308 which is set up to control the transmission device 307, following receipt of the message 306, such that the transmission device 307 sends the communication data 302 to a receiver 309 in the second mode. By way of example, the receiver is the further communication terminal, which is ready to receive the communication data. The receiver may also be a server unit, for example a participant server unit, or the conference control unit 305, which is set up to forward the communication data to the further communication terminal which is ready to receive the communication data.

In line with one exemplary embodiment of the invention, a communication terminal is provided which has an input device which can be used to input communication data needing to be sent in the course of a telecommunication conference into the communication terminal, a memory which stores the input communication data, a reception device which receives from a conference control server unit a message signalling that at least one further communication terminal is ready to receive the communication data, a transmission device which can be operated in a first mode, in which it sends data at a first data rate, and in a second mode, in which it sends data at a second data rate, the second data rate being higher than the first data rate, and a control device which, following receipt of the message, controls the transmission device such that the transmission device sends the communication data in the second mode.

In line with one exemplary embodiment of the invention, a communication terminal is provided which has an input device which can be used to input communication data needing to be sent in the course of a telecommunication conference into the communication terminal, a memory which stores the input communication data, and a reception device which receives from a conference control server unit a message signalling that at least one further communication terminal is ready to receive the communication data. The communication terminal also has a transmission device and also a control device which controls the transmission device, following receipt of the message, such that the transmission device sends the communication data at a data rate which is higher than the data rate required for real-time data transmission of the communication data.

In line with another exemplary embodiment, a communication terminal is provided which has an input device which can be used to input communication data needing to be sent in the course of a telecommunication conference into the communication terminal, and a memory which stores the input communication data. The communication terminal also has a transmission device which can be operated in a first mode, in which it sends data at a first data rate, and in a second mode, in which it sends data at a second data rate, the second data rate being higher than the first data rate, and a control device which controls the transmission device such that it sends a first message specifying that the telecommunication conference needs to be set up. The communication terminal also has a reception device which receives from a conference control server unit a message signalling that at least one further communication terminal is ready to receive the communication data. The control device controls the transmission device such that it does not send any communication data needing to be sent in the course of the telecommunication conference between the time at which the further message is sent and the time at which the message is received, and the control device controls the transmission device, following receipt of the message, such that the transmission device sends the communication data in the second mode.

What is claimed is:

1. A communication terminal comprising:
   an input device configured to input communication data into the communication terminal at an input speed, the input communication data needing to be sent in the course of a telecommunication conference;
   a memory configured to store the input communication data;
   a reception device configured to receive from a conference control server unit a message signaling that at least one further communication terminal is ready to receive the communication data;
   a transmission device configured to operate in a first mode for sending data at a first bit stream data rate, and in a second mode for sending data at a second bit stream data rate, the bit stream second data rate being higher than the first bit stream data rate, wherein in the second mode the data output at the at least one further communication terminal is accelerated in comparison with the speed at which data is input by the input device; and
   a control device, following receipt of the message, configured to control the transmission device for sending the stored input communication data in the second mode at the second bit stream data rate, wherein stored input communication data output at the at least one further communication terminal is accelerated in comparison with the speed at which the input communication data is input, wherein the transmission of the stored input communication data in the second mode catches up with the input of the communication data.

2. The communication terminal according to claim 1, wherein the control device is configured to control the transmission device such that it sends a further message specifying that the telecommunication conference needs to be set up.

3. The communication terminal according to claim 2, wherein the control device is configured to control the transmission device for not sending any communication data needing to be sent in the course of the telecommunication conference between the time at which the further message is sent and the time at which the message is received.

4. The communication terminal according to claim 1, wherein the input device is configured to input the communication data as soon as the further message has been sent.

5. The communication terminal according to claim 1, wherein the message specifies that at least the further communication terminal is participating in the telecommunication conference.

6. The communication terminal according to claim 1, wherein the communication data is at least one of audio data, video data, image data and text data.

7. The communication terminal according to claim 1, wherein the telecommunication conference is a Push-To-Talk conference.

8. The communication terminal according to claim 1, wherein the communication terminal is a mobile radio subscriber appliance.

9. A method for sending communication data, comprising:
   inputting communication data needing to be sent in the course of a telecommunication conference into a communication terminal at an input speed;
   storing the input communication data;
   receiving a message which signals that at least one further communication terminal is ready to receive the communication data; and
   controlling, following receipt of the message, a transmission device, which can be operated in a first mode for sending data at a first bit stream data rate, and in a second mode for sending data at a second bit stream data rate, the second bit stream data rate being higher than the first bit stream data rate, wherein in the second mode the output of data at the at least one further communication terminal is accelerated in comparison with the speed at which data is input by the input device, for sending the stored input communication data in the second mode at the second bit stream data rate, wherein the output of stored input communication data at the at least one further communication terminal is accelerated in comparison with the speed at which the input communication data is input, wherein the transmission of the stored input communication data in the second mode catches up with the input of the communication data.

10. The method for sending communication data according to claim 9, wherein the message is received from a conference control unit.

11. A conference server device comprising:
   a message generation device configured to generate a message signaling that at least one further communication terminal is ready to receive communication data input at the input speed and stored in a communication terminal;
   a transmission device configured to send the message to the communication terminal;
   a reception device configured to operate in a first mode for receiving data transmitted by the communication terminal at a first bit stream data rate, and in a second mode for receiving data at a second bit stream data rate, the second bit stream data rate being higher than the first bit stream data rate, wherein in the second mode the output of received data transmitted by the communication terminal is accelerated in comparison with the speed at which data is input to the communication terminal; and
   a control device, when the message has been sent, configured to control the reception device for receiving the communication data stored in the communication terminal in the second mode at the second bit stream data rate, wherein the output of communication data stored in the communication terminal is accelerated in comparison with the speed at which data is input to the communication terminal, wherein receiving the communication data stored in the communication terminal in the second mode, catches up with an input of the communication data to the communication terminal.

12. A method for forwarding communication data, comprising:
   generating a message which signals that at least one further communication terminal is ready to receive communication data input at the input speed stored in a communication terminal;
   sending the message to the communication terminal; and
   controlling, when the message has been sent, a reception device, which can be operated in a first mode for receiving data transmitted by the communication terminal at a first bit stream data rate, and in a second mode for receiving data at a second bit stream data rate, the second bit stream data rate being higher than the first bit stream data rate, wherein in the second mode the output of data at the at least one further communication terminal is accelerated in comparison with the speed at which data is input in the communication terminal, for receiving the communication data stored at the communication terminal in the second mode at the second bit stream data rate, wherein the output of communication data stored at the communication terminal is accelerated in comparison with the speed at which the input communication data is input in the communication terminal, wherein the transmission of the data stored in the communication terminal in the second mode catches up with the input of the communication data.

13. A communication terminal comprising:
   an input device configured to input communication data at an input speed into the communication terminal, the input communication data needing to be sent in the course of a telecommunication conference;
   a memory configured to store the input communication data;
   a reception device configured to receive from a conference control server unit a message signaling that at least one further communication terminal is ready to receive the communication data;
   a transmission device; and
   a control device configured to control the transmission device, following receipt of the message for sending the stored input communication data at a bit stream data rate which is higher than the bit stream data rate required for real-time data transmission of the communication data, wherein the output of stored input communication data at the at least one further communication terminal is accelerated in comparison with the speed at which the input communication data is input, wherein the transmission of the stored input communication data in the second mode catches up with the input of the communication data.

14. A communication terminal comprising:
   an input device configured to input communication data into the communication terminal at an input speed, the input communication data needing to be sent in the course of a telecommunication conference;
   a memory configured to store the input communication data;
   a transmission device configured to operate in a first mode for sending data at a first bit stream data rate, and in a second mode for sending data at a second bit stream data rate, the second bit stream data rate being higher than the first bit stream data rate;
   a control device configured to control the transmission device for sending a first message specifying that the telecommunication conference needs to be set up; and
   a reception device configured to receive from a conference control server unit a message signaling that at least one further communication terminal is ready to receive the communication data,
   wherein the control device is configured to control the transmission device for not sending any communication data needing to be sent in the course of the telecommunication conference between the time at which the first message is sent and the time at which the message is received, and the control device configured to control the transmission device, following receipt of the message for sending the stored input communication data in the second mode at the second bit stream data rate, wherein the output of stored input communication data at the at least one further communication terminal is accelerated in comparison with the speed at which the input communication data is input, wherein the transmission of the stored input communication data in the second mode catches up with the input of the communication data.

* * * * *